June 7, 1955
N. S. BORCH
2,710,280
METHOD AND APPARATUS FOR EXPELLING VOLATILE
CONSTITUENTS FROM SOLID CARBONACEOUS FUEL
Filed March 21, 1951
2 Sheets-Sheet 1
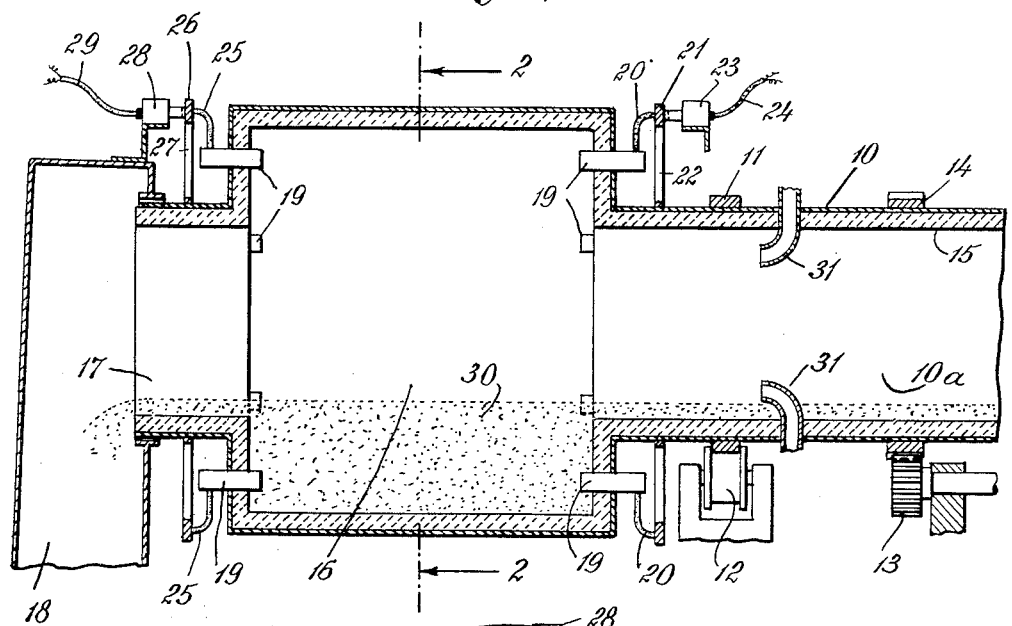
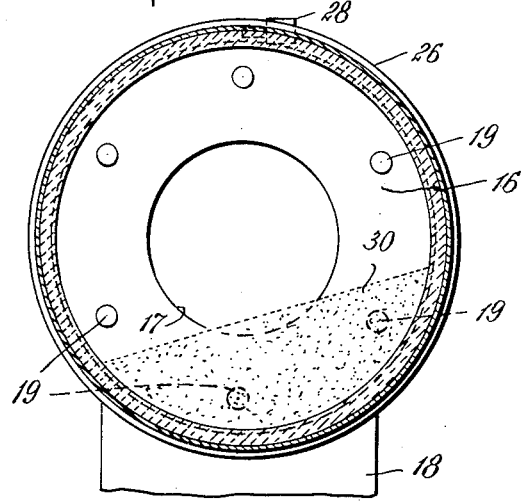
INVENTOR
Neils Sofus Borch
BY
Pennie Edmonds Morton Barrows Taylor
ATTORNEYS June 7, 1955

N. S. BORCH 2,710,280

METHOD AND APPARATUS FOR EXPELLING VOLATILE
CONSTITUENTS FROM SOLID CARBONACEOUS FUEL

Filed March 21, 1951

INVENTOR
Niels Sofus Borch
BY
Pennie Edmonds, Morton Barrows Taylor
ATTORNEYS

United States Patent Office 2,710,280
Patented June 7, 1955

2,710,280

METHOD AND APPARATUS FOR EXPELLING VOLATILE CONSTITUENTS FROM SOLID CARBONACEOUS FUEL

Niels Sofus Borch, Copenhagen, Denmark, assignor to F. L. Smidth & Co., New York, N. Y., a corporation of New Jersey Application March 21, 1951, Serial No. 216,836

5 Claims. (Cl. 202—13)

This invention relates to the treatment of solid carbonaceous fuels, such as bituminous coal, coke, petroleum coke, anthracite, etc., for the purpose of expelling volatile constituents therefrom. More particularly, the invention is concerned with a novel method for expelling the volatile constituents from such solid fuels by the use of an electric current as a heating means and with an apparatus, by which the new method may be advantageously practiced.

The calcination of solid carbonaceous fuels by passing an electric current through the fuel to heat it has heretofore been practiced in apparatus, such as stack kilns, in which the fuel being heated is normally at rest. In such an operation, the different parts of the charge of material are non-uniformly heated, since the current flow is along a relatively few haphazard paths with the result that the material, through which the current flows, is brought to a high temperature and may be excessively heated, while the remaining parts of the material, through which there is little or no current flow, remains at a relatively low temperature. These objectionable features are encountered particularly in the calcination of anthracite to be used in the manufacture of electrodes for electric smelting and like kilns, where, because of the uneven heating, the quality of the electrodes produced is impaired.

The present invention is directed to the provision of a novel method, by which solid carbonaceous fuels may be heated uniformly by the passage of an electric current therethrough to expel the volatile constituents from the fuel, and with apparatus, by which the method may conveniently be practiced. In the use of the method, the charge of material, through which the electric current is passed is agitated during the flow of current, and bridges of material forming paths for the flow of current and otherwise subjected to excessive heating, are constantly broken down. As a result, all of the material is heated uniformly and insufficient heating and overheating of portions of the material are prevented.

The agitation, to which the material is subjected during the flow of current therethrough, may be effected in a rotary drum or kiln having a heating zone, through which the material continuously advances. The material approaching this zone through the kiln may then be preheated by heat contained in the expelled volatile constituents and may be subjected to agitation during the preheating, so that efficient heat transfer from the constituents to the fuel is obtained. The process may thus be a continuous one with the expelled volatile gases effectively utilized to improve the economy of the entire operation.

In the preheating of the fuel advancing through the kiln to the heating zone, both the sensible and the latent heat of the expelled constituents may be utilized. For this purpose, air is supplied to effect burning of the combustible volatile material and the combustion takes place in the presence of the fuel traveling toward the heating zone. The utilization of the heat in the expelled constituents for preheating the fuel is of substantial advantage and, in the treatment of anthracite, the heat contained in the constituents and available for preheating may be the equivalent of about 1000 kw.-hr. per ton. The preheating of material by heat derived from combustion of the expelled volatile constituents can be practiced only with great difficulty in an electrically heated shaft kiln of the kind ordinarily employed in the treatment of anthracite, since the kiln is filled with a column of material which will burn by addition of air. The practice of the new method thus involves important savings, which cannot be readily obtained in shaft kiln operation.

In the practice of the method of the invention, the fuel is heated in the heating zone without addition of air to a temperature sufficient to expel the volatile constituents and not substantially greater than about 1500° C. Under such conditions, the volatile constituents are all expelled and the final product is satisfactory for use in the production of electrodes for electric kilns.

The new apparatus for the practice of the method of the invention comprises a vessel for holding a charge of material and capable of being caused to move, as by being rotated, rocked, vibrated, etc., to effect agitation of the contents. Preferably, the vessel has the form of a rotary drum or kiln and, in any of its forms, it is provided with electrodes, between which current may flow through the material. The electrodes are in constant contact with the material being agitated and, when the vessel has the form of a rotary kiln, the electrodes are mounted thereon and connected with annular bus bars mounted on the kiln and engaged by stationary sliding contacts. A potential may thus be applied to the electrodes to cause current to flow from one ring and one set of electrodes through the charge of material to the other set of electrodes and the other ring.

A preheating chamber is connected to the vessel and the material is continuously passed through the chamber and through the vessel. The chamber is connected to the vessel so as to be rotated, rocked, vibrated, etc., therewith and is provided with means for supplying air for combustion of the expelled volatile constituents issuing from the vessel and escaping through the chamber. With this construction, the material traveling through the chamber to the vessel is continuously agitated and effectively preheated by combustion of the expelled constituents.

For a better understanding of the invention, reference may be made to the accompanying drawings, in which:

Fig. 1 is a vertical longitudinal sectional view of one form of apparatus for the practice of the method of the invention;

Fig. 2 is a sectional view on the line 2—2 of Fig. 1;

Figure 3:
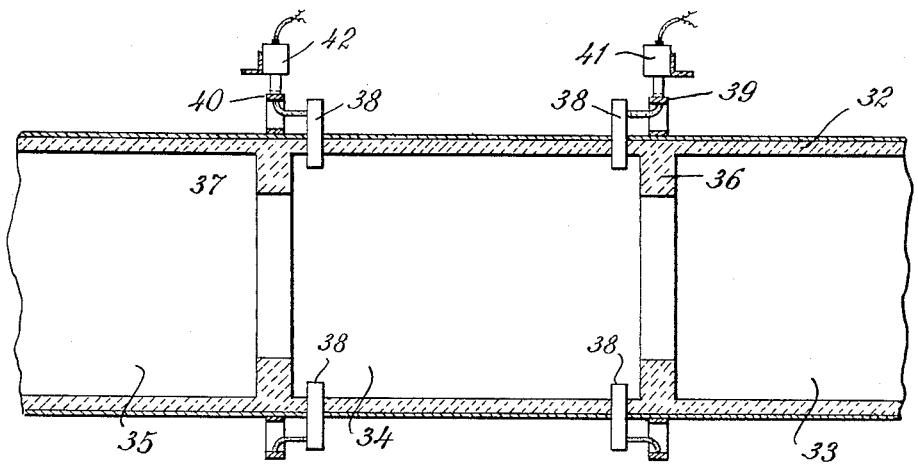
Fig. 3 is a vertical longitudinal sectional view through another form of the apparatus.

The apparatus disclosed in Fig. 1 includes a drum or kiln 10 provided with tires 11 supported on rollers 12 and rotated by a pinion 13 meshing with a gear 14 encircling the drum. The kiln has the usual lining of insulating material 15 and it is formed with a preheating section 10a and a heating section 16 of increased diameter. Beyond the section 16, the kiln has an outlet section 17 of normal diameter discharging into casing 18.

A plurality of electrodes 19 are mounted to extend through the radial walls of section 16 and, in the construction shown, six electrodes extend through each of these walls. The electrodes extending through one radial wall of section 16 are connected by cables 20 to an annular bus bar 21 carried by and insulated from supports 22 attached to the outer surface of the drum and the bus bar is engaged by a stationary contact 23, to which cable 24 is attached. The electrodes extending through the other radial wall of the drum are similarly connected by cables 25 to an annular bus bar 26 mounted on supports 27 attached to the outer surface of the discharge section of the drum and bus bar 26 is engaged by a stationary contact 28 connected to a cable 29. The electrodes are mounted in the radial walls of section 16 in such manner that they can be pushed inward as they become worn and they are readily interchangeable. In the heating operation, current flows through the charge of material 30 within the heating section 16 from one or more electrodes of one set to one or more electrodes of the other set. The electrodes are sufficiently closely spaced, so that at least one electrode of each set is in contact with the charge at all times.

The volatile constituents expelled by heating of the charge in the heating section 16 escape through the preheating section 10a. The fresh material is fed to the heating section through the preheating section and the expelled constituents thus give up heat to the material being fed. Air supply pipes 31 are mounted in openings in the wall of the preheating section, so that air may be introduced into that section for combustion of the volatile constituents therein in contact with the material being fed. The pipes are mounted at a sufficient distance from the heating section to insure that there will be no ignition of the fuel within the heating section.

In the operation of the apparatus of Figs. 1 and 2 in accordance with the new method, the material to be heated, which is of the size ordinarily used in electrically heated shaft kilns, is introduced into the upper end of the preheating section 10a of the kiln and advances therethrough as the kiln is rotated. During such advance, the material is constantly agitated, so that it is effectively heated by heat from the volatile constituents and the combustion thereof. When the material enters the heating section 16, the material is again maintained in continuous agitation and an electric current is passed through the charge from one or more electrodes of one set to one or more of the other set. Because of the constant agitation of the charge, the paths of the current through the material are constantly changing, so that uniform heating is obtained. The withdrawal of the constituents through the preheating section may be effected by connecting the intake end of the section to a chimney and a fan may be employed between the intake end of the section and the chimney to maintain the desired draft. The heated material leaving the heating section 16 passes through the discharge section 17 into casing 18 and the material may be cooled by conventional apparatus to produce heated air, which may be introduced into the preheating section for combustion of the volatile constituents therein.

In the form of apparatus shown in Fig. 3, the drum 32 is divided into preheating section 33, a heating section 34, and a discharge section 35 by internal rings 36, 37, which serve to dam the material. Set of electrodes 38 are mounted to extend through radial openings in the wall of the heating section 34 at opposite ends thereof. The electrodes of each set are connected to respective annular bus bars 39, 40 engaged by stationary contacts 41, 42, the construction being generally similar to that employed in the apparatus of Fig. 1. In the operation of the Fig. 3 apparatus, the material is introduced into the upper end of the preheating section and, as it moves down through that section, it is preheated by the volatile constituents, which may be burned in contact with the material as above described. Within the heating section 34, a current flows through the charge of material and uniform heating is obtained because of the constant agitation of the material. The heated material then leaves through the discharge section 35 and may be handled as previously described.

The results obtained in the calcination of English anthracite for the production of material suitable for electrodes to be used in electric kilns make clear the advantages of the new method. For comparison, a quantity of the anthracite was calcined in the usual manner in an electrically heated shaft kiln at a power consumption of 1000 kw.-hr. per ton. A similar quantity of the same anthracite was then calcined in accordance with the new method in a rotary kiln, the anthracite being preheated to 1000° C. by means of the heat developed by combustion of the expelled volatile constituents. The power consumption for heating the material in the electrically heated zone was about 300 kw.-hr. per ton.

Figure 4:
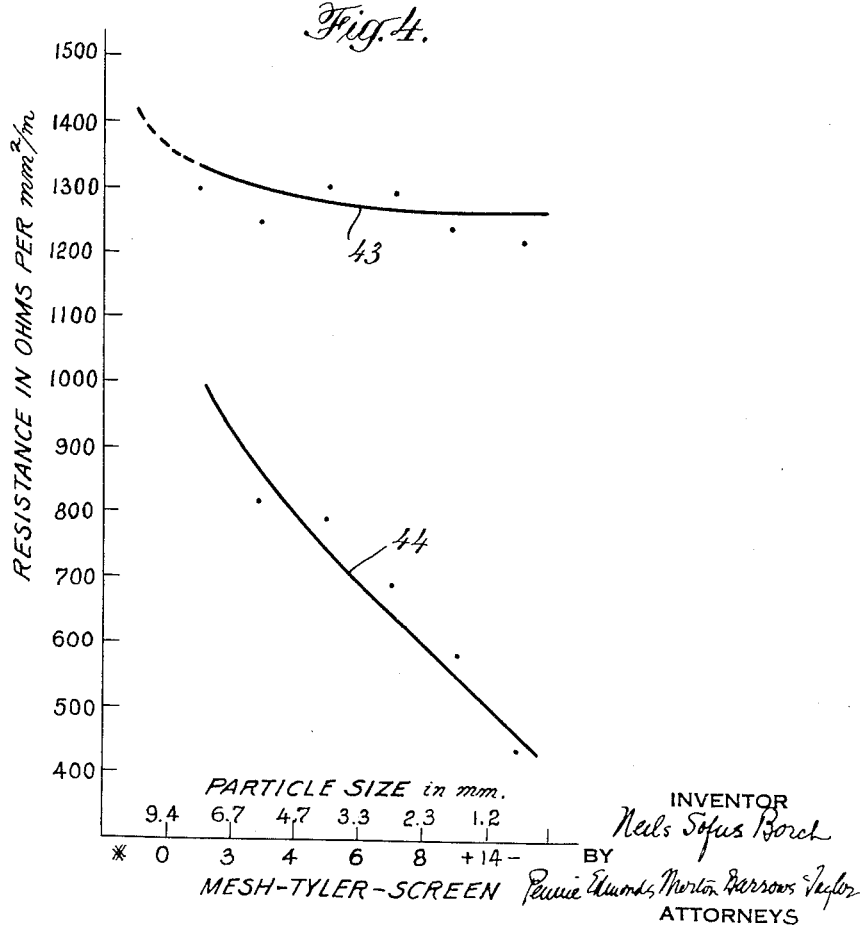
Fig. 4 is a graph including curves showing the improved results obtained by the practice of the process.

The graph, Fig. 4, comprises two curves showing the quality of the material produced by the process of the invention as compared with that of material heated in a conventional electrically heated shaft kiln. On the graph, the ordinates used are the values of resistance in ohms for a quantity of the material 1 sq. mm. in section and 1 m. long. The abscissae are the particle sizes in millimeters and also the corresponding screen sizes of Tyler standard sieves.

The upper curve 43 of the graph relates to anthracite calcined in accordance with the method of the invention and the lower curve 44 relates to the same anthracite calcined in the conventional shaft kiln. The upper curve indicates that the resistance of the material produced in accordance with the invention was quite uniform, regardless of particle size, whereas, as shown by the lower curve, the resistance of material produced in the shaft kiln varied over a wide range depending on particle size. The curve thus demonstrate that a much superior calcination was obtained by the practice of the method of the invention.

Sample electrodes having the same electrical resistance and made of anthracite calcined in a conventional electrically heated shaft kiln and in a rotary kiln according to the method of the invention were found to have widely differing compression strengths. The compression strength of electrodes of anthracite calcined in the shaft kiln was 152 kg. per sq. cm., whereas the electrodes made of anthracite calcined in accordance with the new method were found to have a compression strength of 260 kg. per sq. cm. The uniform calcination obtained by the method of the invention thus produced a calcined anthracite of much greater compression strength than the anthracite produced in the shaft kiln.

While the apparatus has been illustrated as including a drum or kiln of cylindrical section, it will be apparent that the cross-sectional shape is not important and the cross-section may be polygonal or of other form. Also, it is not necessary that the heating be effected in a chamber having a rotary movement so long as the chamber is moved, as by vibration, rocking, etc., to insure continuous agitation of the material. Preferably, the heating is effected in a rotary drum or kiln having a heating section and a preheating section, through which the material continuously advances with constant agitation, but the apparatus may be employed in forms in which batches of the material are preheated and calcined, while being agitated.

The heating section may on both cases be constituted by a short drum through each end of which passes at least one stationary electrode which is in constant contact with the charge of material in the drum. If so, the preheating zone may be constituted by a separate drum into which the volatile gases are passed.

Furthermore, it will be apparent that in some cases it may be preferred to utilize only a portion of the expelled volatile gases in the preheating zone; for instance, the air supply to the said preheating zone may be adapted in such manner that only a portion of the said volatile gases are burnt.

I claim:

1. Apparatus for expelling the volatile constituents of solid carbonaceous fuel which comprises a drum mounted for rotation about a generally horizontal axis and including a pre-heating section and a heating section, the heating section having means for maintaining a charge of predetermined depth therein, means for rotating the drum to agitate the fuel in a direction transverse thereof and to advance the fuel first through the pre-heating section and then through the heating section, electrodes mounted on the wall of the heating section and spaced about the axis of the drum at opposite ends of said section, said electrodes being in two sets, with one set mounted at one end portion of the heating chamber and the other set mounted at the other end portion thereof, said sets being so spaced about the drum that opposite electrodes of each set are always submerged in the fuel in the heating section as the drum rotates, means for applying potential across the electrodes to cause flow of current through the charge in the heating section while the charge is being agitated, the volatile constituents escaping from the heating section through the pre-heating section, and a plurality of air supply pipes mounted in openings through the wall of the pre-heating section of the drum at a substantial distance from the heating section, the air supply pipes terminating within the interior of the drum inwardly from the wall a distance greater than the normal thickness of the fuel traveling through the pre-heating section.

2. Apparatus for expelling the volatile constituents from solid carbonaceous fuel which comprises a drum mounted for rotation about a generally horizontal axis and including a pre-heating section and a heating section, the heating section having its dimension normal to the axis of rotation greater than the corresponding dimension of the heating section, and having means for retaining a charge of fuel therein, means for rotating the drum to agitate and advance the fuel first through the pre-heating section and then through the heating section, electrodes mounted on the wall of the heating section and spaced about the axis of the drum at opposite ends of said section, said electrodes being in two sets, with one set mounted on one end wall of the heating section and the other set mounted on the other end wall thereof, means for applying potential across the electrodes to cause flow of current through the charge in the heating section while the charge is being agitated, the volatile constituents escaping from the heating section through the preheating section, and a plurality of air supply pipes mounted in openings through the wall of the pre-heating section of the drum at a substantial distance from the heating section, the pipes terminating within the interior of the drum inwardly from the wall a distance greater than the normal thickness of the fuel traveling through the pre-heating section.

3. The method of expelling the volatile constituents from carbonaceous fuel which comprises continuously advancing the fuel through a generally horizontally-extending enclosure including a pre-heating section and a heating section having means for maintaining a charge of predetermined depth therein, both sections being only partially filled with material lying at the bottom thereof, continuously agitating the fuel in a direction transversely of the enclosure throughout its travel therethrough, heating the charge of fuel within the heating section without the addition of air to a temperature sufficient to expel the volatile constituents by causing an electric current to pass through the charge substantially from end-to-end in the direction of travel of the fuel, withdrawing the volatile constituents from the heating section through the pre- heating section countercurrent to and in direct contact with the fuel advancing therethrough and being agitated therein, and introducing air into the space within the pre-heating section above the fuel being advanced therethrough to cause the combustible constituents expelled from the heated charge to be burned above and in contact with the fuel, the air being introduced into the pre-heating section at such a distance from the heating section that it does not enter the heating section.

4. The method of expelling the volatile constituents from carbonaceous fuel as set forth in claim 3 in which the fuel is discharged from the heating section from the upper portion of the charge therein.

5. The method of expelling the volatile constituents from carbonaceous fuel which comprises continuously advancing the fuel through a generally horizontally-extending enclosure including a pre-heating section and a heating section having a transverse dimension greater than the transverse dimension of the pre-heating section, both sections being only partially filled with material lying at the bottom thereof, and the charge of fuel in the heating section having a depth greater than the charge in the pre-heating section, continuously agitating the fuel in a direction transversely of the enclosure throughout its travel therethrough, heating the charge of fuel within the heating section to a temperature sufficient to expel the volatile constituents by causing an electric current to pass through the charge substantially from end-to-end in the direction of travel of the fuel, withdrawing the volatile constituents from the heating section through the pre-heating section countercurrent to and in direct contact with the fuel advancing therethrough and being agitated therein, and introducing air into the space within the pre-heating section above the fuel being advanced therethrough to cause the combustible constituents expelled from the heated charge to be burned above and in direct contact with the fuel, the air being introduced into the pre-heating section at such a distance from the heating section that it does not enter the heating section.

References Cited in the file of this patent

UNITED STATES PATENTS

| Number | Name | Date |
| --- | --- | --- |
| 750,094 | Cowles | Jan. 19, 1904 |
| 763,369 | Conley | June 28, 1904 |
| 1,057,213 | Benjamin | Mar. 25, 1913 |
| 1,480,148 | Broome | Jan. 8, 1924 |
| 1,480,152 | Cox | Jan. 8, 1924 |
| 1,500,323 | Jenkins | July 8, 1924 |
| 1,551,956 | Hubmann | Sept. 1, 1925 |
| 1,731,473 | Naugle | Oct. 15, 1929 |
| 1,805,109 | Runge et al. | May 12, 1931 |
| 1,811,021 | Patart et al. | June 23, 1931 |
| 2,167,099 | Benezech | July 25, 1939 |
| 2,374,742 | Galusser | May 1, 1945 |
| 2,435,825 | Goss | Feb. 10, 1948 |

FOREIGN PATENTS

| Number | Country | Date |
| --- | --- | --- |
| 602,780 | France | Aug. 31, 1925 |